(12) United States Patent
Miller

(10) Patent No.: US 11,722,303 B2
(45) Date of Patent: *Aug. 8, 2023

(54) SECURE ENCLAVE IMPLEMENTATION OF PROXIED CRYPTOGRAPHIC KEYS

(71) Applicant: Garantir LLC, San Diego, CA (US)

(72) Inventor: Kieran Miller, San Diego, CA (US)

(73) Assignee: Garantir LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/532,883

(22) Filed: Nov. 22, 2021

(65) Prior Publication Data

US 2022/0385470 A1 Dec. 1, 2022

Related U.S. Application Data

(63) Continuation of application No. 17/334,511, filed on May 28, 2021, now Pat. No. 11,218,317.

(51) Int. Cl.
*H04L 9/32* (2006.01)
*H04L 9/08* (2006.01)
(Continued)

(52) U.S. Cl.
CPC .......... *H04L 9/3226* (2013.01); *G06F 21/602* (2013.01); *H04L 9/0819* (2013.01);
(Continued)

(58) Field of Classification Search
CPC ... H04L 9/3226; H04L 9/0819; H04L 9/0897; H04L 9/14; H04L 9/321; H04L 2209/76; H04L 9/3242; H04L 9/3247; H04L 9/3271; G06F 21/602; G06F 21/6218; G06F 21/53
See application file for complete search history.

(56) References Cited

U.S. PATENT DOCUMENTS 7,711,120 B2 5/2010 Kimmel et al.
7,958,347 B1 6/2011 Ferguson
(Continued)

OTHER PUBLICATIONS

Miller, U.S. Appl. No. 17/334,550, filed May 28, 2021, Non-Final Rejection, dated Sep. 3, 2021.
(Continued)

*Primary Examiner* — Abiy Getachew
(74) *Attorney, Agent, or Firm* — Hickman Becker Bingham Ledesma LLP

(57) ABSTRACT

Techniques for employing a secure enclave to enhance the security of a system that makes use of a remote server that proxies cryptographic keys. In one technique, a proxy server receives a request for a cryptographic operation that is initiated by a client device. The request includes a key name of a cryptographic key and a (e.g., authentication) code. In response, the proxy server sends the code and the request to a secure enclave that is associated with a cryptographic device that stores the cryptographic key. The secure enclave validates the code based on a local key and sends, to the cryptographic device, (1) data associated with the secure enclave and (2) the cryptographic request. The proxy server receives result data that was generated by the cryptographic device that performs the cryptographic operation. The proxy server sends the result data to the client device.

20 Claims, 7 Drawing Sheets

(51) Int. Cl.
  *H04L 9/14* (2006.01)
  *G06F 21/60* (2013.01)
(52) U.S. Cl.
  CPC .............. *H04L 9/0897* (2013.01); *H04L 9/14* (2013.01); *H04L 9/321* (2013.01); *H04L 2209/76* (2013.01)

(56) References Cited

U.S. PATENT DOCUMENTS

| | | |
|---|---|---|
| 8,613,070 B1 | 12/2013 | Borzycki |
| 8,873,747 B2 | 10/2014 | Polzin et al. |
| 9,020,149 B1 | 4/2015 | Golwalkar |
| 9,154,488 B2 | 10/2015 | Innes |
| 9,223,950 B2 | 12/2015 | Li |
| 9,584,325 B1 | 2/2017 | Brandwine et al. |
| 9,887,975 B1 * | 2/2018 | Gifford ............ H04W 12/0431 |
| 10,164,955 B1 | 12/2018 | Halcrow et al. |
| 10,491,576 B1 | 11/2019 | Pfannenschmidt et al. |
| 10,872,152 B1 * | 12/2020 | Martel .................. G06F 21/31 |
| 11,218,317 B1 * | 1/2022 | Miller ................. H04L 9/3226 |
| 2008/0019527 A1 | 1/2008 | Youn et al. |
| 2010/0042545 A1 | 2/2010 | Ogg et al. |
| 2010/0093273 A1 | 4/2010 | Hohl |
| 2014/0019753 A1 | 1/2014 | Lowry et al. |
| 2016/0088022 A1 | 3/2016 | Handa et al. |
| 2016/0156621 A1 | 6/2016 | Thom et al. |
| 2016/0380985 A1 | 12/2016 | Chhabra et al. |
| 2017/0006018 A1 | 1/2017 | Campagna et al. |
| 2017/0024584 A1 | 1/2017 | Chhabra et al. |
| 2017/0228559 A1 | 8/2017 | Jackson |
| 2017/0357830 A1 | 12/2017 | Benson et al. |
| 2018/0167203 A1 * | 6/2018 | Belenko ............ H04L 63/0435 |
| 2018/0205711 A1 | 7/2018 | Kumar et al. |
| 2018/0367311 A1 | 12/2018 | Stahlberg et al. |
| 2019/0229902 A1 | 7/2019 | Zheng et al. |
| 2019/0394024 A1 | 12/2019 | Vepa et al. |
| 2020/0076585 A1 | 3/2020 | Sheppard et al. |
| 2020/0136822 A1 | 4/2020 | Villapakkam et al. |
| 2020/0145199 A1 | 5/2020 | Kounavis et al. |
| 2020/0244445 A1 | 7/2020 | Ponnusamy et al. |
| 2020/0244454 A1 | 7/2020 | Gupta et al. |
| 2020/0304299 A1 | 9/2020 | Medvinsky et al. |
| 2021/0036851 A1 | 2/2021 | Villapakkam et al. |
| 2021/0056547 A1 | 2/2021 | Monica et al. |
| 2021/0111886 A1 * | 4/2021 | Leiserson ............ H04L 9/3263 |
| 2021/0124823 A1 | 4/2021 | Lidzborski et al. |
| 2021/0173916 A1 * | 6/2021 | Ortiz .................... G06V 10/454 |
| 2021/0203491 A1 | 7/2021 | Wei et al. |
| 2021/0218555 A1 | 7/2021 | Mastenbrook et al. |
| 2021/0320789 A1 | 10/2021 | Medvinsky et al. |

OTHER PUBLICATIONS

Miller, U.S. Appl. No. 17/334,550, filed May 28, 2021, Final Rejection, dated Dec. 24, 2021.
Miller, U.S. Appl. No. 17/334,511, filed May 28, 2021, Notice of Allowance, dated Aug. 18, 2021.
Miller, U.S. Appl. No. 17/229,426, filed Apr. 13, 2021, Office Action, dated Jun. 21, 2021.
Miller, U.S. Appl. No. 17/229,426, filed Apr. 13, 2021, Notice of Allowance and Fees Due, dated Sep. 9, 2021.
Miller, U.S. Appl. No. 17/467,073, filed Sep. 3, 2021, Non-Final Rejection, dated Nov. 10, 2021.
Miller, U.S. Appl. No. 17/334,550, filed May 28, 2021, Notice of Allowance and Fees Due, dated Mar. 28, 2022.
Miller, U.S. Appl. No. 17/467,073, filed Sep. 3, 2021, Final Rejection, dated Apr. 5, 2022.
Bortolozzo et al., "Attacking and Fixing PKCS#11 Security Tokens", ACM, Year 2010, 10 pages.
Miller, U.S. Appl. No. 17/334,550, filed May 28, 2021, Notice of Allowance and Fees Due, dated Jun. 20, 2022.
Miller, U.S. Appl. No. 17/467,073, filed Sep. 3, 2021, Notice of Allowance and Fees Due, dated Aug. 22, 2022.
Miller, U.S. Appl. No. 17/467,073, filed Sep. 3, 2021, Notice of Allowance and Fees Due, dated Jul. 18, 2022.

* cited by examiner

SECURE ENCLAVE IMPLEMENTATION OF PROXIED CRYPTOGRAPHIC KEYS

RELATED CASE

This application claims the benefit as a continuation of application Ser. No. 17/334,511, filed May 8, 2021; the entire contents of which is hereby incorporated by reference. This application is related to U.S. patent application Ser. No. 17/334,550, entitled "Shared Secret Implementation of Proxied Cryptographic Keys," filed on May 28, 2021, the entire contents of which are hereby incorporated by reference as if fully set forth herein.

TECHNICAL FIELD

The present disclosure relates generally to cryptographic keys and, more specifically, to enhancing the security of a system that makes use of a remote server that proxies cryptographic keys.

BACKGROUND

Cryptography is the practice and study of techniques for secure communication in the presence of third parties called adversaries. More generally, cryptography is about constructing and analyzing protocols that prevent third parties or the public from reading private messages. Various aspects in information security, such as data confidentiality, data integrity, authentication, and non-repudiation are central to modern cryptography. Cryptographic keys, which are applied to messages, are central to securing those messages.

However, current approaches for maintaining cryptographic keys are deficient. Such approaches involve storing cryptographic keys on client devices. In enterprises with many client devices, managing such storage is difficult and security is poor. For example, a hacker that gains access to one of the client devices has access to all the cryptographic keys stored on that client device and, as a result, is able to authenticate itself to a resource server, thus impersonating the client device. Therefore, the hacker can access resources that are made available through the resource server and that are accessible to the client device as a result of its cryptographic keys. Also, if the same compromised cryptographic keys are stored on all client devices, then compromising only a single client device is sufficient for the hacker to potentially obtain access to all privileged resources that require those cryptographic keys.

Another approach for maintaining cryptographic keys is to store them remotely from client devices in a secure cryptographic device. Thus, in order to leverage a cryptographic key, the client device must be configured to communicate with the cryptographic device. However, some enterprises require the provisioning of multiple cryptographic devices. Therefore, configuring each client device in an enterprise to communicate with each cryptographic device or only with certain cryptographic device quickly becomes a significant management burden and very error prone.

Another approach for maintaining cryptographic keys is a variation on the last approach, except that a central proxy server manages access to the cryptographic device(s). Thus, a client device sends a request for a cryptographic operation to the proxy server and the proxy server communicates with a cryptographic device so that the cryptographic operation is performed. This simplifies the configuration of client devices in the enterprise. However, by offloading the management of cryptographic keys and operations from client devices to a central proxy server, the central proxy server has access to (and can persistently store) a significant amount of key-related information, such as key names or identifiers of cryptographic keys stored in a cryptographic device, passwords or personal identification numbers (PINs) of those cryptographic keys, and wrapped versions of those keys.

Some cryptographic keys are associated with a password, an example of which is a PIN. If so, then a cryptographic device requires the PIN before performing a cryptographic operation using the associated cryptographic key. Thus, the proxy server would provide a key name and a PIN to a cryptographic device, which determines whether the received PIN matches a PIN that the cryptographic device stores in association with the key name.

A "wrapped key" is a cryptographic key that is encrypted and can only be decrypted by a cryptographic device that stores a key to decrypt the cryptographic key, typically in a manner such that the "unwrapped key" is not exportable from the cryptographic device. A cryptographic device, such as an HSM, may provide wrapped keys to client devices and/or a proxy server if the cryptographic device does not have enough room to store all the cryptographic keys required by an enterprise.

PINs and wrapped keys are examples of "secret key information." As a result of having access to secret key information, the proxy server becomes a target of hackers who desire access to that secret key information.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, some structures and devices are shown in block diagram form in order to avoid unnecessarily obscuring the present invention.

General Overview

A system and method for enforcing authentication in a secure enclave are provided. Such enforcement is a guarantee that even a compromised proxy server will not be able to reveal secret key information. In one technique, a proxy server receives a request for a cryptographic operation that is initiated by a client device. The request includes a key name of a cryptographic key and an authentication code. In response to receiving the request, the proxy server sends the authentication code and the request to a secure enclave that is associated with a cryptographic device that stores cryptographic keys that includes the cryptographic key. The secure enclave validates the authentication code based on a local key that is stored in the secure enclave. The secure enclave also sends (1) data associated with the secure enclave and (2) the cryptographic request to the cryptographic device that performs the cryptographic operation. The proxy server receives result data that was generated by the cryptographic device as a result of performing of the cryptographic operation. The proxy server forwards the result data to the client device.

System Overview

Figure 1:
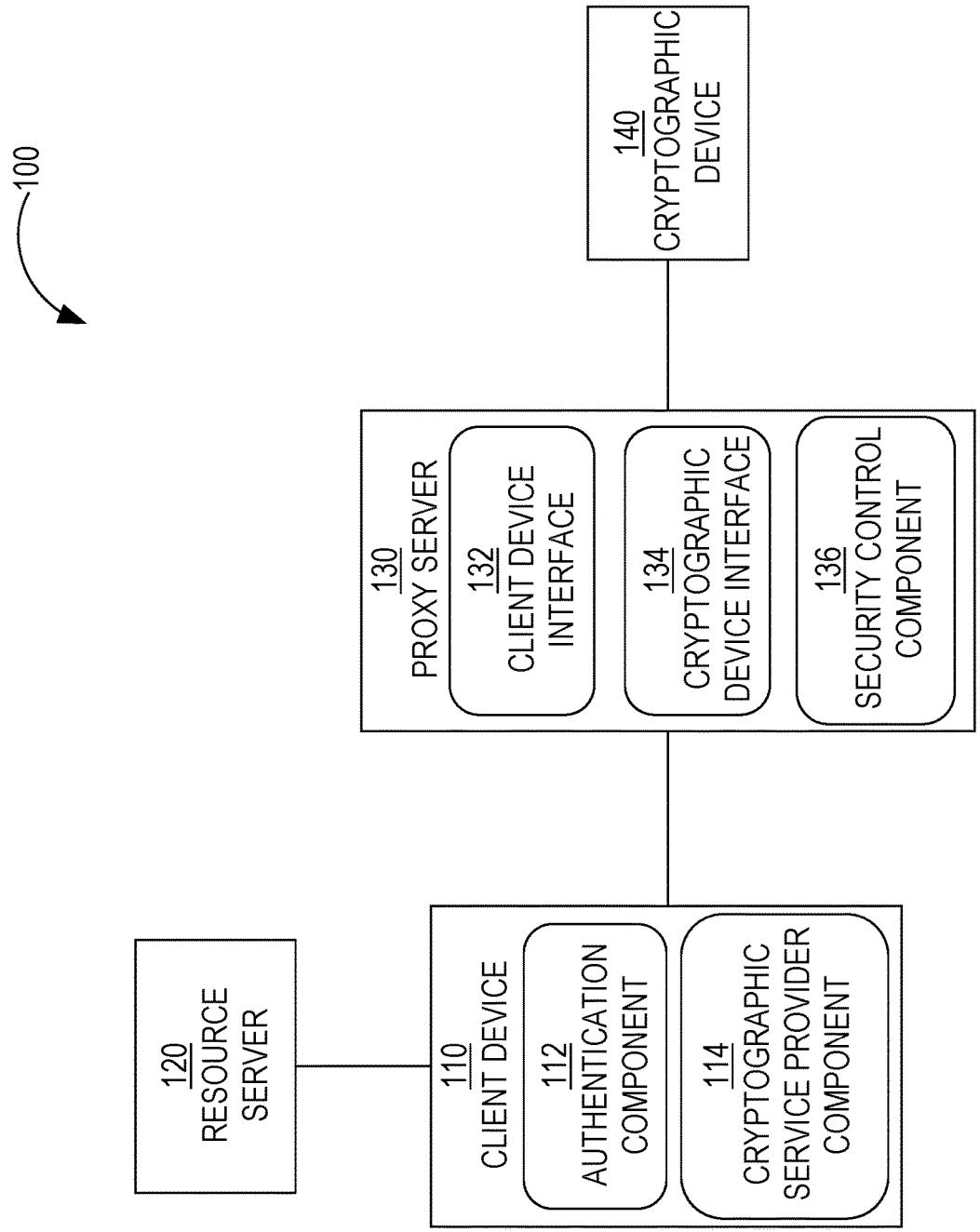
FIG. 1 is a block diagram that depicts an example system for enhancing authentication by enforcing security controls on remote cryptographic keys, in an embodiment.

FIG. 1 is a block diagram that depicts an example system for enhancing authentication by enforcing security controls on remote cryptographic keys, in an embodiment. System 100 includes a client device 110, a (optional) resource server 120, a proxy server 130, and a cryptographic device 140. These elements or components of system 100 may reside in different networks or in the same network. For example, system 100 is implemented in the same physical site (or premises) owned by a particular entity (e.g., a company) that requests digital signatures. As another example, system 100 is implemented in a virtual private cloud (VPC) that is part of a third-party cloud service, but that is dedicated to a single entity (e.g., a company) that requests digital signatures. Alternatively, some elements of system 100 (e.g., client device 110 and proxy server 130) may be implemented on a company's premises and other elements of system 100 (e.g., resource server 120) may be implemented in a VPC that is dedicated to supporting the company.

Server 120 is "privileged" in the sense that server 120 manages access to "privileged" resources, which are resources that require a requesting client to be authenticated before access to those resources are granted.

Client device 110 includes an authentication component 112 that executes on client device 110 and is configured to communicate with resource server 120. Authentication component 112 includes a cryptographic service provider (CSP) component 114 that is configured to communicate with proxy server 130, such as routing authentication challenges to proxy server 130 in response to authentication challenges from resource server 120 and routing decryption requests to proxy server 130.

Client device 110 is communicatively coupled to resource server 120 and proxy server 130 over one or more computer networks (not depicted). Examples of such a network include a local area network (LAN), a wide area network (WAN), and the Internet. Although only one client device 110 is depicted, system 100 may include multiple client devices that are communicatively coupled to servers 120 and 130. In the case of multiple client devices, a load balancer may sit between multiple proxy servers (not depicted) and the multiple client devices. The load balancer balances cryptographic requests (from the multiple client devices) among the multiple proxy servers, such that each proxy server has approximately the same load (e.g., as measured by the number of cryptographic requests each proxy server is currently processing).

A cryptographic request may be a request for a digital signature for authentication purposes, a request to decrypt certain data, a request for authenticating a MAC (message authentication code), or a request for Diffie-Hellman (D-H) request, which is a request to exchange cryptographic keys over a public channel, such as the Internet.

A cryptographic or authentication request from client device 110 to proxy server 130 includes challenge data, such as a hash. A cryptographic request may also include a data identifier that identifies a data item upon which the hash is based. In the context of signing code, the data item is a set of one or more source code files and the data identifier is a source revision number. In the context of signing an electronic document, the data item is the electronic document and the data identifier is a document identifier, such as a URL or a path name that uniquely identifies a logical storage location of the document.

If cryptographic device 140 stores multiple keys, then the cryptographic request may also include a key ID that uniquely identifies one of the keys. The cryptographic request may also include data that identifies which hashing algorithm was used to produce the hash, as well as parameters of the hashing and signature algorithms. Such parameters are used for one or more reasons. For example, in certain cases (e.g., RSA signing) the hash is prepended with an algorithm identifier before signing. This prepending may be performed server-side, in which case the hash algorithm used needs to be known. As another example, in order to validate a hash independently, the hash algorithm needs to be known. As another example, the identity of the hashing algorithm may be used for future auditing purposes.

In an embodiment, authentication component 112 and CSP component 114 are separate from application code that executes on client device 110 and that includes separate business logic pertaining to task(s) client device 110 is intended to perform. An example of such application code is a build server that takes part in the build process to create, from source code, one or more executables of a software program. Another example of such application code is a word processing application that allows for the digital signing of electronic documents, where a master copy of an electronic document is stored in a central document repository. An example of client device 110 is a computing device operated by a single person who directly requests a digital signature for a piece of data, decryption of a piece of data, or a D-H exchange to occur.

Resource Server

Resource server 120 manages access to resources that are stored by or "behind" resource server 120. Resource server 120 grants resource requests to authenticated and authorized users. Thus, resource server 120 responds to requests for those resources after requestors are authenticated. Resource server 120 initiates a challenge-response handshake in response to receiving, from client device 110 and other client devices, a request for a resource. The challenge is provided by resource server 120 to client device 110 and client device 110 needs to provide the correct response in order to be authenticated to resource server 120.

Resource server 120 may implement one or more challenge-response-based protocols. In some such protocols, the challenge is explicit, such as a hash value that client device 110 needs to decrypt with an appropriate cryptographic key. In another such protocol, the challenge is implicit, such as through TOTP (time-based one-time password). According to this algorithm, the authenticatee and authenticator preestablish both HOTP (HMAC-based one-time password) parameters and the following TOTP parameters: (1) $T_0$, the Unix time from which to start counting time steps (default is 0); and (2) $T_X$; an interval which will be used to calculate the value of the counter $C_T$ (default is 30 seconds). Both the authenticator and the authenticatee compute the TOTP value, then the authenticator checks if the TOTP value supplied by the authenticatee matches the locally generated TOTP value.

Resource server 120 may be communicatively connected to one or more databases, one or more file systems, and/or one or more cloud services. Also, resource server 120 may host one or more online services and/or is connected to one or more computing devices that hosts one or more online services. Examples of privileged resources include data, applications, and online services. An example of a resource server is a privileged server, which serves only privileged users, who are typically considered to be system administrators.

Resource server 120 may be hosted "on premise" of an enterprise that owns the data protected by the resource server 120. That is, one or more instances of resource server 120 execute on one or more computing devices that are also owned by the enterprise. Alternatively, resource server 120 may be hosted by cloud hosting service, which owns the computing devices that execute one or more instances of resource server 120.

Client device 110 generates and transmits, to proxy server 130, a cryptographic request that may include data, such as challenge data from resource server 120, and one or more parameters. The cryptographic request includes a key name or identifier that identifies a cryptographic key stored at cryptographic device 140. Client device 110 uses one or more techniques to communicate with resource server 120. One example technique is using a RESTful API, which is an application programming interface that uses HTTP requests to GET, PUT, POST, and DELETE data. A RESTful API is based on representational state transfer (REST) technology, which is an architectural style and approach to communications used in web services development.

Proxy Server

Proxy server 130 is responsible for providing cryptographic services (e.g., providing digital signatures) to client device 110 (and, potentially, other clients, not depicted) upon receiving a cryptographic request from client device 110. Proxy server 130 is implemented on one or more computing devices that are separate from client device 110. As noted above, system 100 may include multiple instances of proxy server 130 that are able to process cryptographic requests from one or more client devices. The multiple instances may be implemented on one or more computing devices.

Proxy server 130 includes a client device interface 132 and a cryptographic device interface 134. Client device interface 132 sends data to and receives data from client device 110 (and other client devices not depicted) while cryptographic device interface 134 sends data to and receives data from cryptographic device 140. Each of interfaces 132-134 is implemented in software, hardware, or any combination of software and hardware.

In response to receiving an authentication request, proxy server 130 sends challenge data to cryptographic device 140, which selects a private key, generates a digital signature based on the private key and the challenge data, and returns the digital signature to proxy server 130. Proxy server 130 sits in between cryptographic device 140 and client device 110, thus, hiding the complexity of client device 110 having to interact directly with cryptographic device 140. In a related example, decryption is used as part of an authentication protocol. Here, resource server 120 encrypts random data with a user's (or client device's) public key and asks the user/client device to decrypt the encrypted random data with the private key of the user/client device. If the user/client device successfully decrypts the data, then the user/client device is authenticated. At the point of decryption, the additional security controls would be triggered.

Similarly, in response to receiving a decryption request, proxy server 130 sends encrypted data to cryptographic device 140, which selects a private key, decrypts the encrypted data based on the private key, and returns the decrypted data to proxy server 130.

Cryptographic Device

Cryptographic device 140 is a device that stores one or more private cryptographic keys and that is accessible to proxy server 130. Examples of cryptographic device 140 include a key manager, a hardware security module (HSM), and a software-based keystore. Cryptographic device 140 may be remote or local relative to proxy server 130, which does not have direct access to the keys stored by cryptographic device 140, making system 100 secure.

If cryptographic device 140 stores multiple private keys, then each key may be associated with a different key identifier (ID). Thus, a signature request from server 120 may include a key ID, which may have originated in the corresponding signature request that server 120 received from client 110.

Although system 100 depicts only one cryptographic device 140, system 100 may include multiple cryptographic devices that store keys for generating digital signatures for client device 110 and, optionally, other client devices (not depicted). In other words, client device 110 may, at different times, request cryptographic services involving different keys that are stored in different cryptographic devices.

System 100 may include other elements that are not depicted, such as (1) a notification server that generates and sends notifications in response to (i) cryptographic request failures and/or successes, (ii) cryptographic requests from certain client devices or users, and/or (iii) cryptographic requests for certain keys, (2) one or more administrative servers that allow administrators to perform certain duties (e.g., user management, key management), and (3) a message broker that allows proxy server 130, any administrative servers, and any notification server to communicate.

Additional Security Controls

As described herein, in an embodiment, proxy server 130 (and, optionally, one or more other elements of system 100 interacting with proxy server 130) performs (or at least initiates) one or more additional security controls in response to a cryptographic request from client device 110. In this way, resource server 120 does not have to be updated to support these additional security controls. In this embodiment where proxy server 130 initiates one or more security controls, proxy server 130 includes a security control component 136 that implements one or more security controls and/or communicates with other components or devices that implement one or more security controls.

A result of initiating a security control may be a pass or fail, a success or failure. (As described in more detail below, a result of initiating a security control may be a non-binary value that is in a range, such as between 0 and 1, or that is one of three or more possible values representing classes of a result.) If a component that is separate from proxy server 130 implements the security control, then the component sends proxy server 130 the result in an electronic message.

If client device 110 or the user operating client device 110 fails or does not pass an additional security control, then proxy server 130 drops the cryptographic request or does not return an intended response to the cryptographic request if such a response was generated. For example, in response to receiving a cryptographic request, proxy server 130 initiates one or more additional security controls at or near the same time that proxy server 130 sends challenge data to cryptographic device 140 for signing (or sends encrypted data to cryptographic device for decrypting). Thus, in this scenario, the time required for the one or more additional security controls to return with a response or result does not delay the processing of the cryptographic request.

In an embodiment, proxy server 130 initiates multiple security controls in sequence. For example, proxy server 130 initiates security control A, initiates security control B only if security control A passes, and initiates security control C only if second control B passes. Additionally or alternatively, proxy server 130 initiates multiple security controls in parallel. For example, proxy server 130 initiates security controls A, B, and C at or around the same time without waiting for one of the security controls to complete or finish.

In an embodiment where multiple security controls are initiated by a cryptographic request, proxy server 130 may proceed with processing the cryptographic request if any of the security controls result in a pass or success, indicating that the cryptographic request may be responded to positively.

In an embodiment where multiple security controls are initiated by a cryptographic request, if a client device or user passes a particular security control, then the client device or user does not have to pass any more security controls. However, if the client device or user does not pass the particular security control, then the client device or user must pass one or more of the other security controls.

The number and types of additional security controls that proxy server 130 initiates may vary from one implementation to another and from one client device or user to another client device or user. For example, some users may require one set of additional security controls while other users may require another set of additional security controls. As another example, some classes of client devices may require one set of additional security controls while other classes of client devices may not require any additional security controls. As another example, different types of keys may be assigned different security controls. As a specific example, production keys may have strict security controls while non-production keys (e.g., "test" or "sandbox" keys) may have more relaxed (if any) security controls.

Security control component 136 determines whether one or more of the initiated security controls pass or return successful. Based on the implementation, security control component 136 may notify client device interface 132 or cryptographic device interface 134 upon the determination. For example, if security control component 136 determines that all security controls (that were initiated in response to a cryptographic request) return a success, then security control component 136 notifies cryptographic device interface 134 to forward the cryptographic request to cryptographic device 140. As another example, if security control component 136 determines that all security controls (that were initiated in response to a cryptographic request) return a success and if cryptographic device interface 134 already sent the cryptographic request to cryptographic device 140, then security control component 136 notifies client device interface 132 to send a response that was already generated by cryptographic device 140. As another example, if security control component 136 determines that at least one security control (that was initiated in response to a cryptographic request) returns a failure, then security control component 136 notifies client device interface 132 to send a response to client device 110 informing client device 110 of the failure.

Examples of security controls that proxy server 130 initiates (e.g., through security control component 136) in response to cryptographic requests include multi-factor authentication (MFA), device authentication, approval workflow, IP address whitelisting, geo-location check, key check, and a rules engine that scores a cryptographic request, which score is used to determine whether to process the cryptographic request. Some of these security controls may involve additional communication with client device 110 in order to complete a security operation, such as MFA, device authentication, and, optionally, approval workflow.

Example Process for Client Authentication

Figure 2:
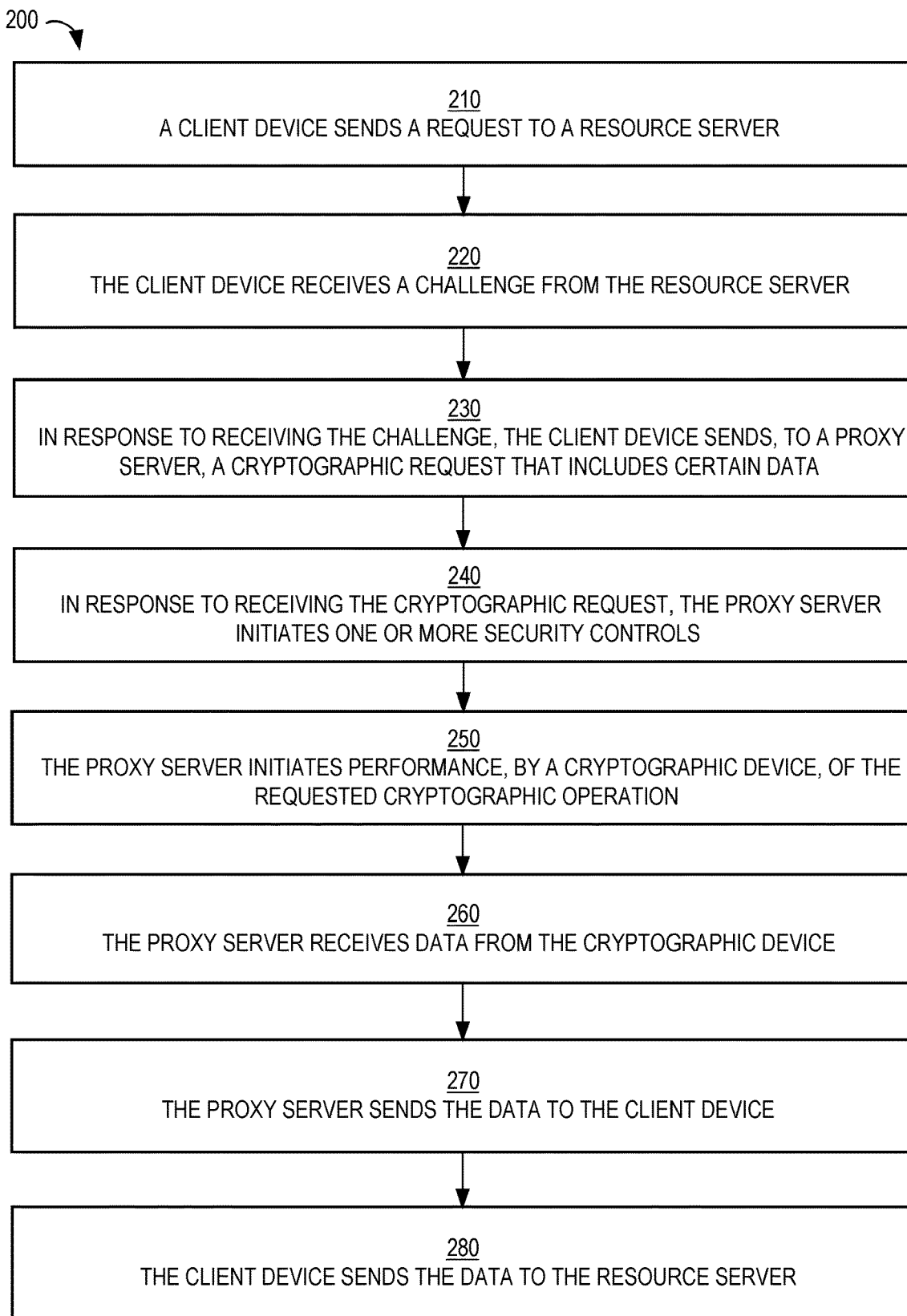
FIG. 2 is a flow diagram that depicts an example process for processing cryptographic requests, in an embodiment.

FIG. 2 is a flow diagram that depicts a process 200 for processing cryptographic requests, in an embodiment. Process is implemented by different entities in system 100.

At block 210, a client device sends a request to a resource server. If the request is for a resource, then the requested resource may be data or a service. The request is sent over a computer network, such as a LAN, WAN, or the Internet. The resource server may be on premise of the enterprise that owns or manages access to privileged resources. Alternatively, the resource server may be hosted by a cloud service provider that is different than the enterprise. Block 210 may be performed by authentication component 112.

At block 220, the client device receives, from the resource server, an authentication challenge, which may include challenge data, such as a hash value. The resource server may randomly generate the challenge data either before the resource server received the request or in response to receiving the request. Again, block 220 may be performed by authentication component 112.

At block 230, in response to receiving the authentication challenge, the client device sends, to a proxy server, an authentication/cryptographic request that includes the challenge data or other data if the challenge did not include challenge data. The authentication request is a type of cryptographic request that requests a digital signature that will be used by the client device to authenticate itself to the resource server. The request may include a type indicator that indicates a type of cryptographic operation, such as decryption, encryption, or D-H key exchange. Block 230 may be performed by CSP component 114.

At block 240, in response to receiving the authentication request, the proxy server initiates (or even executes) one or more security controls. For example, the proxy server may execute one security control and initiate another security control that another component executes. One or more of the initiated security protocols may involve electronic communication with the client device in order to complete a security operation associated with a security control. Block 240 may involve client device interface 132 informing security control component 136 about the authentication request.

At block 250, the proxy server initiates performance of the requested cryptographic operation. Examples of cryptographic operations include digital signature generation, data decryption, message authentication code generation, and D-H key exchange. For example, the proxy server sends the challenge data to a cryptographic device, which generates a digital signature based on the challenge data. In the case of data decryption for authentication, the cryptographic device decrypts the challenge data. Block 250 may involve the proxy server sending, to the cryptographic device, a type indicator that indicates the type of cryptographic operation requested.

Block 250 may be performed before the one or more security controls complete and, therefore, may be initiated at the same time as block 240 initiates. Block 250 may also involve sending one or more parameter values, such as a key identifier that the cryptographic device uses to identify the appropriate key stored therein. Block 250 may be performed by cryptographic device interface 134.

At block 260, the proxy server receives data (e.g., a digital signature or decrypted data) from the cryptographic device. Thus, between block 250 and block 260, the cryptographic device selects a key (from among multiple keys) (e.g., identified in the data sent in block 250) and generates the digital signature by applying the key to the challenge data.

At block 270, the proxy server sends the received data (e.g., the digital signature or decrypted data) to the client device. Block 270 is only performed if the one or more security controls initiated by the proxy server complete successfully. For example, the proxy server delays sending the digital signature until at least one security control returns with a positive result. As another example, the proxy server delays sending the digital signature until all security controls that were initiated, in response to the authentication request, return a positive result.

The proxy server maintains connection data between the client device and the proxy server, where the connection data identifies the client device and is associated with the signature request sent to the cryptographic device. In this way, when the proxy server receives the digital signature from the cryptographic device, the proxy server associates the digital signature with the client device and, specifically, with the authentication request that triggered blocks 240-270.

At block 280, the client device sends the data (e.g., digital signature) to the resource server, which grants the request for the resource, assuming that the appropriate key was used to generate the data. Block 280 may be performed by authentication component 112.

Example Process for Content Decryption

Figure 3:
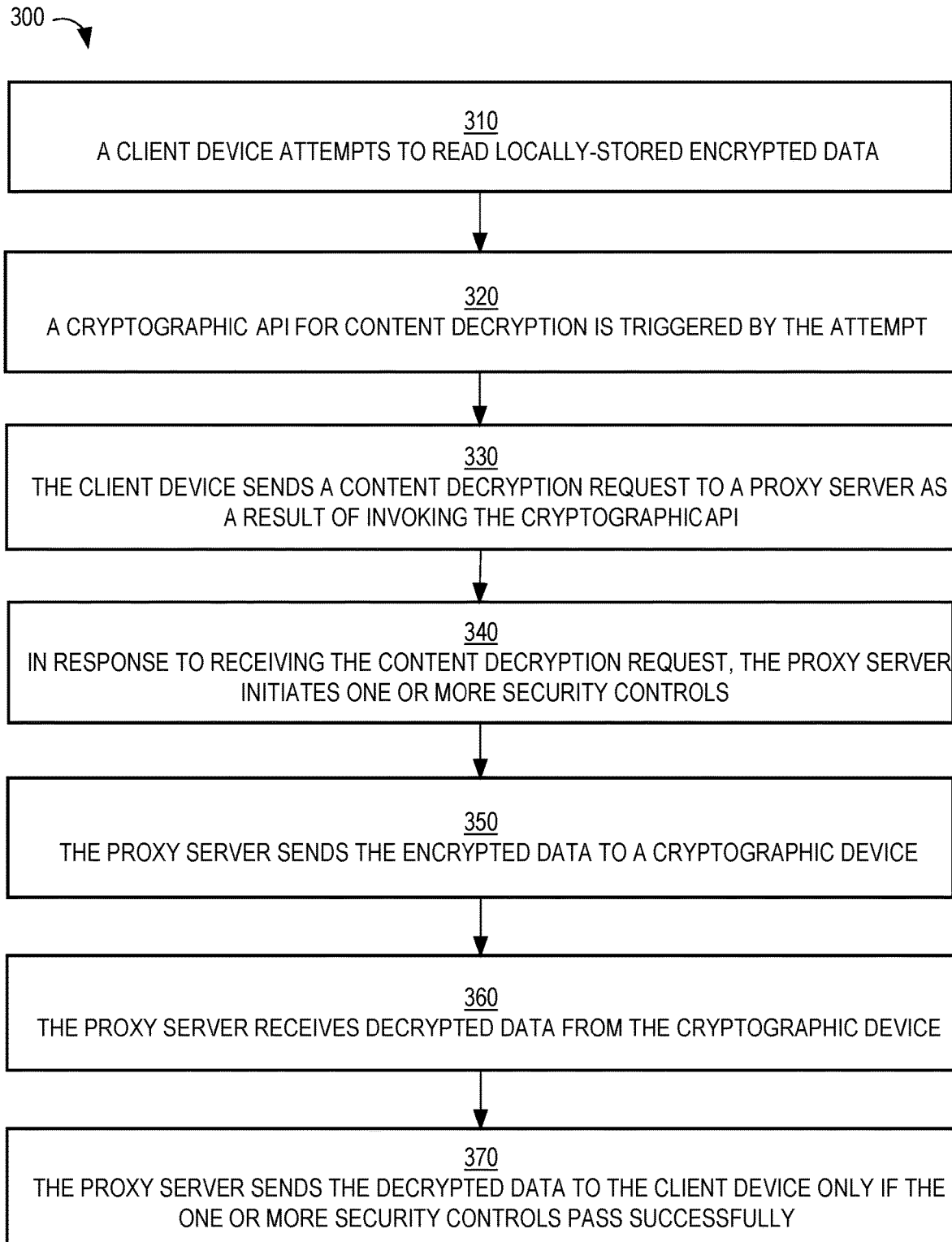
FIG. 3 is a flow diagram that depicts a process for processing content decryption requests, in an embodiment.

FIG. 3 is a flow diagram that depicts a process 300 for processing content decryption requests, in an embodiment. Process 300 is implemented by client device 110 and proxy server 130.

At block 310, a client device attempts to read locally stored encrypted data. Block 310 may be performed by an application executing on the client device, such as an email application attempting to opening an encrypted email or an encrypted attachment, a PDF (portable document format) reader application attempting to read an encrypted PDF file, or file system application attempting to open a file stored on the client device.

At block 320, a cryptographic API for content decryption is triggered by the attempt. For example, the client application (e.g., a PDF reader or email client) makes the cryptographic API call, which can be routed through a series of API calls that eventually results in calling a portion of the client device's operating system, which then calls CSP component 114, which is registered with the operating system.

At block 330, the client device sends a content decryption request to a proxy server as a result of invoking a cryptographic API call. Block 320 may be performed by CSP component 114. The content decryption request includes the encrypted data. The content decryption request is sent over a computer network, such as a LAN, WAN, or the Internet. In cases where the encrypted data is stored remotely, the encrypted data is (a) downloaded first to the client device (e.g., from resource server 120 or another remote server not depicted) and then transmitted to proxy server 130 or (b) downloaded from the remote location to proxy server 130 in response to proxy server 130 receiving the content decryption request. In the latter scenario, the content decryption request includes remote storage data that indicates from where proxy server 130 is to retrieve the encrypted data.

At block 340, in response to receiving the content decryption request, the proxy server initiates one or more security controls. For example, the proxy server may execute one security control and initiate another security control that another component executes. One or more of the security protocols may involve electronic communication with the client device in order to complete a security operation associated with a security control.

At block 350, the proxy server sends the encrypted data to a cryptographic device. The proxy server may also send a key identifier or other data that the cryptographic device uses to decrypt the encrypted data. If the content decryption request includes a reference to the encrypted data, then block 350 may first involve retrieving the encrypted data, which may be stored at the client device (in which cases a request is transmitted to the client device) or remotely at another location, which may be in an external network.

Block 350 may be performed only after the one or more initiated security controls complete successfully. Thus, the proxy server waits for the one or more security controls to complete successfully before block 350 is performed. Alternatively, block 350 is performed prior to the proxy server receiving any indication that the one or more security controls have completed. Thus, in this scenario, the proxy server checks for successful completion of the one or more security controls prior to performing block 370.

At block 360, the proxy server receives the decrypted data from the cryptographic device.

At block 370, the proxy server sends the decrypted data to the client device, after which the client device (or the application executing thereon that triggered process 300) is able reads the decrypted data.

Split Secret Model

As noted herein, by offloading the management of cryptographic keys and operations from client devices to a central proxy server (e.g., proxy server 130), the central proxy server has access to (and can persistently store) a significant amount of key-related information, such as key names or identifiers of cryptographic keys stored in a cryptographic device, passwords or personal identification numbers (PINs) of those cryptographic keys, and wrapped versions of those keys. As a result of having access to secret key information, the central proxy server becomes a target of hackers who desire access to that secret key information.

In an embodiment, to prevent the unauthorized use of secret key information in case of proxy server 130 becoming compromised or the cryptographic device being stolen, access to the secret key information is split among client device 110 and proxy server 130. Splitting such access involves requiring client device 110 to provide the secret key information to proxy server 130 on a per request basis and requiring proxy server 130 to delete (and not persistently store) the secret key information when it is no longer needed. (The proxy server 130 may delete the secret key information explicitly in the logic of software code in which proxy server 130 is written or implicitly through automatic garbage collection provided through a high-level programming language in which software code of proxy server 130 may be written.) Thus, after proxy server 130 sends secret key information (received from client device 110) to cryptographic device 140, proxy server 130 deletes (either explicitly or implicitly through automatic garbage collection) the secret key information from volatile memory, such as RAM and cache.

In an embodiment, secret key information is included in a cryptographic request (e.g., a digital signature request or a decryption request) from client device 110. In this embodiment, client device 110 persistently stores the secret key information, whether a PIN or a wrapped key, in association with a key name or identifier. If client device 110 stores multiple secret key information for different cryptographic keys stored at cryptographic device 140, then client device 110 stores, for each cryptographic key, secret key association data that associates secret key information with a key name or identifier for the cryptographic key. In a related embodiment, client device 110 stores two instances of secret key information for the same cryptographic key. For example, client device 110 stores a PIN and a wrapped key to which the PIN applies. In other words, the PIN is used to authorize use (by cryptographic device 140) of the cryptographic key that is encrypted in the wrapped key.

Figure 4A:
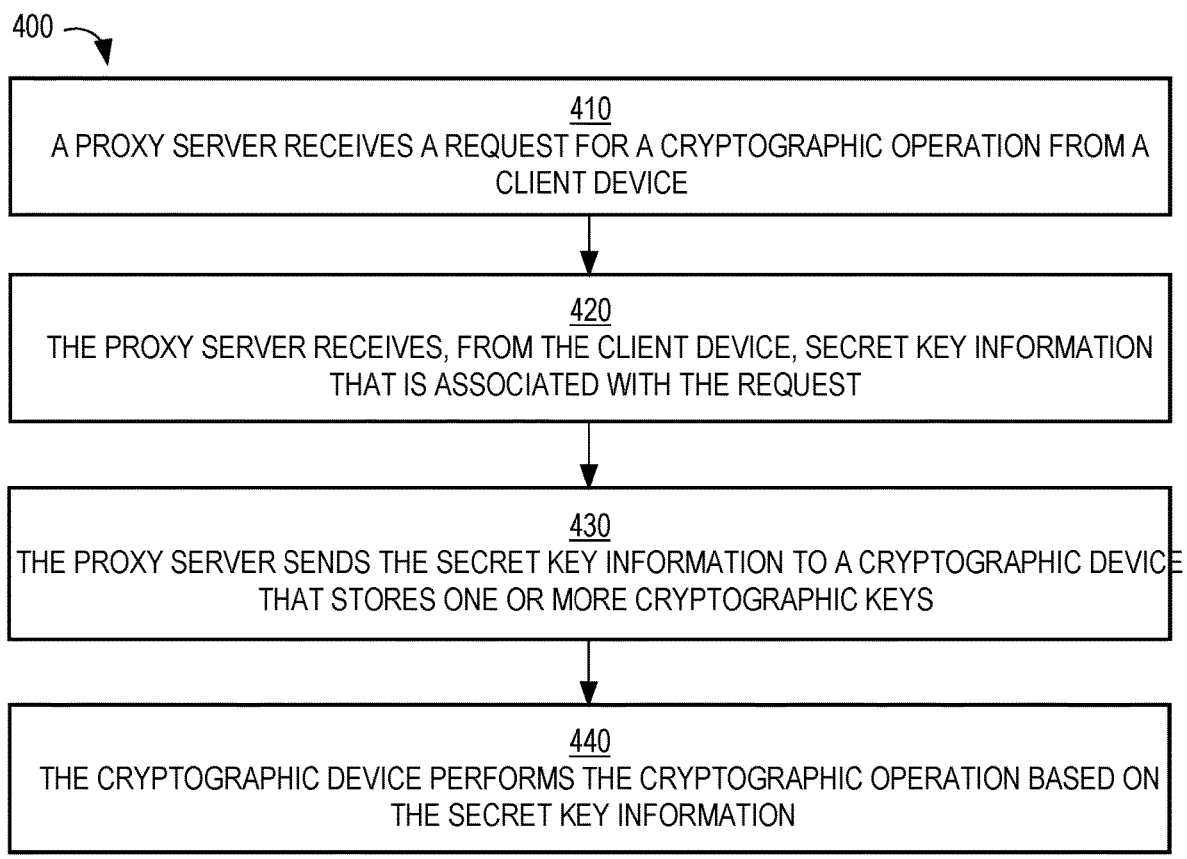
FIGS. 4A-4B are flow diagrams that depict example processes for enhancing the security of a proxy server, in an embodiment.

FIG. 4A is a flow diagram that depicts an example process 400 for enhancing the security of a proxy server, in an embodiment. Process 400 may be performed by different elements of system 100.

At block 410, a proxy server receives a request for a cryptographic operation from a client device.

At block 420, the proxy server receives, from the client device, secret key information that is associated with the request. Prior to the request, the proxy server did not have access to the secret key information. The secret key information may be part of the request received in block 410.

At block 430, while storing the secret key information in memory of the proxy server, the proxy server sends the secret key information to a cryptographic device that stores one or more cryptographic keys. The proxy server does not store the secret key information in any persistent storage.

At block 440, the cryptographic device performs the cryptographic operation based on the secret key information.

Encrypted Secret Key Information

In an alternative embodiment, proxy server 130 stores secret key information in an encrypted form and client device 110 stores a (decryption) key to decrypt the encrypted secret key information. In response to a cryptographic request from client device 110 for a cryptographic operation to be performed, proxy server 130 identifies a key name or identifier in the cryptographic request, retrieves encrypted secret key information (e.g., a PIN) that is associated with the key name and sends the encrypted secret key information to client device 110. Client device 110 receives the encrypted secret key information and uses a locally-stored decryption key to decrypt the encrypted secret key information.

In an embodiment, initially, before client device 110 sends a cryptographic request specifying a cryptographic key, proxy server 130 encrypts secret key information associated with the cryptograph key using a public key. The public key may be associated with client device 110 specifically or with client devices generally, in cases where there are multiple client devices in system 100. (Alternatively, each client device may be associated with a different public-private key pair.) Client device 110 stores the private key that is used to decrypt the encrypted secret key information. In a related embodiment, the key pair on client device 110 and proxy server 130 is symmetric, meaning the key used to encrypt (or "encryption key") and the key used to decrypt (or "decryption key") are the same.

Figure 4B:
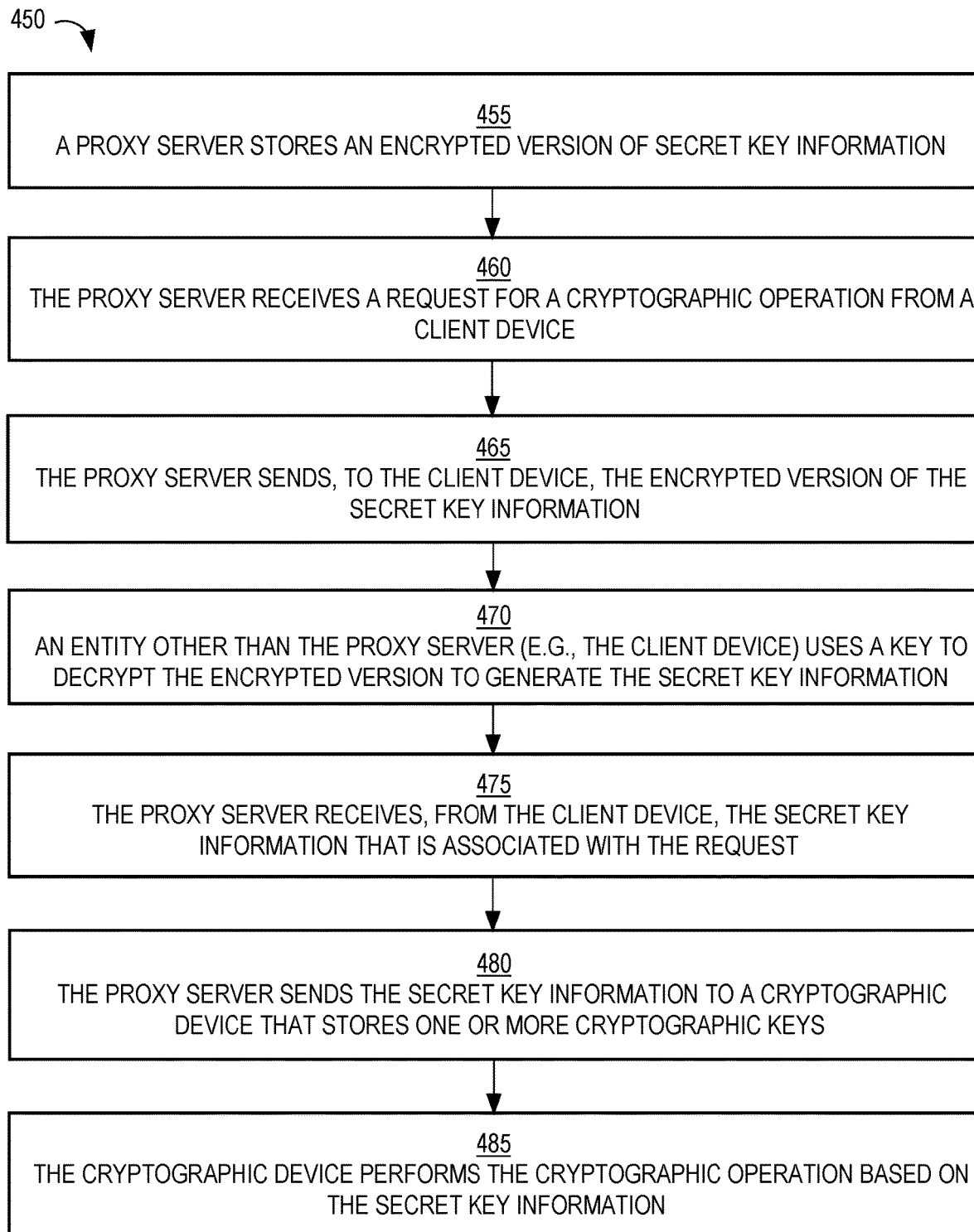

FIG. 4B is a flow diagram that depicts an example process 450 for enhancing the security of a proxy server, in an embodiment. Process 450 may be performed by different elements of system 100.

At block 455, a proxy server stores an encrypted version of secret key information. The proxy server may have received the encrypted version from a cryptographic device, a client device, or another device.

At block 460, the proxy server receives a request for a cryptographic operation from a client device.

At block 465, the proxy server sends, to a client device, the encrypted version of the secret key information.

At block 470, an entity other than the proxy server uses a key to decrypt the encrypted version of the secret key information to generate the secret key information.

At block 475, the proxy server receives, from the client device, secret key information that is associated with the request. Prior to this receipt, the proxy server did not have access to the secret key information.

At block 480, while storing the secret key information in memory of the proxy server, the proxy server sends the secret key information to a cryptographic device that stores one or more cryptographic keys. The proxy server does not store the secret key information in any persistent storage.

At block 485, the cryptographic device performs the cryptographic operation based on the secret key information.

An advantage of this approach where proxy server 130 stores the secret key information in encrypted form is that the overall system is better protected from a cyberattack. First, most compromises of proxy server 130 will not result in the secret key information being useable because the secret key information is encrypted. (However, if an attacker is able to monitor data flowing through a compromised proxy server, then the attacker may be able to read the decrypted secret information when the client device sends it to the proxy server.) Second, any compromise of client device 110 cannot result in the secret key information being exposed as long as client device 110 deletes, from volatile memory, the decrypted secret key information after sending the decrypted secret key information to proxy server 130.

In a related embodiment, where there are multiple client devices that are communicatively coupled to proxy server 130 and that send cryptographic requests to proxy server 130, each client device stores a different decryption key. Thus, proxy server 130 may store a different (e.g., public or symmetric) encryption key.

Enforce Authentication Checking in a Secure Enclave

Even with the above approach of the split secret model, parties other than proxy server 130 must still trust that proxy server 130 wipes or deletes the secret key information from memory and does not store the secret key information in any persistent storage. To address this concern, in an embodiment, a secure enclave is used by proxy server 130 or cryptographic device 140 to enforce authentication code checking. (Examples of an authentication code include a digital signature and a MAC (or message authentication code).) In short, client device 110 generates an authentication code based on a cryptographic request and the secure enclave verifies the authentication code and sends the cryptographic request to cryptographic device 140 only if the authentication code is verified. (The secure enclave may also determine whether the authentication code was generated using a proper key, which may involve comparing the key (e.g., a public key) against a while list of allowed keys, or performing certification chain validation.) Also, the authentication code is only good for a particular cryptographic request. Thus, even if proxy server 130 retains the authentication code, proxy signature 130 could not use it for any other cryptographic request.

A secure enclave is a secure coprocessor that includes a hardware-based key manager that is isolated from the main processor to provide an extra layer of security. A secure enclave provides CPU hardware-level isolation and memory encryption on a server by isolating application code and data from anyone with privileges and encrypting its memory. With additional software, secure enclaves enable the encryption of both storage and network data for full stack security. Hardware support for a secure enclave may be built into a CPU when the CPU is manufactured. A secure enclave is a physical, tamper-resistant area that has its own code base that knows to verify a digital signature. A secure enclave may reside on cryptographic device 140 or on a computing device that hosts proxy server 130. Secure enclaves are sometimes referred to as "trusted execution engines" or TEEs. A secure enclave may or may not have network access for transmitting data requests to remote devices (i.e., over a network).

A cryptographic device, such as an HSM, performs attestation where a secure enclave can prove that the secure enclave is certain firmware running in a secure enclave. Attestation is a way for one party to prove to another party that the first party is currently running certain code and the other party/device can verify that. In embodiments herein, with a secure enclave added to system 100, cryptographic device 140 can verify that the secure enclave is who the secure enclave claims to be and is an entity that cryptographic device 140 can trust.

One way to prove that a secure enclave is an entity that cryptographic device 140 can trust is by storing a hash of executable code that is running in the secure enclave. Cryptographic device 140 can validate the hash and, as a result, the cryptographic device can trust that the secure enclave performed signature validation and, therefore, cryptographic device 140 will perform the requested cryptographic operation using the requested cryptographic key.

In an embodiment, a remote secure enclave (relative to client device 110) controls the use of a cryptographic key that client device 110 is requesting by checking a digital signature that client device 110 (and/or another device/party, such as an approver) previously generated based on a cryptographic request that client device 110 generated. In this way, proxy server 130 cannot sign on behalf of a client device. With (1) the secure enclave and (2) the digital signature generated by client device 110 added to system 100, cryptographic device 140 is able to know that an authorized entity attempted to use the requested cryptographic key, rather than a compromised proxy server 130 or someone else with stolen credentials. Also, in this way, cryptographic device 140, which has limited capacity to do these added signature checks, effectively offloads these checks to the secure enclave. A main job of cryptographic device 140 is to secure the cryptographic keys while a job of the secure enclave us to verify a digital signature generated by the requestor (e.g., client device 110).

Figure 5:
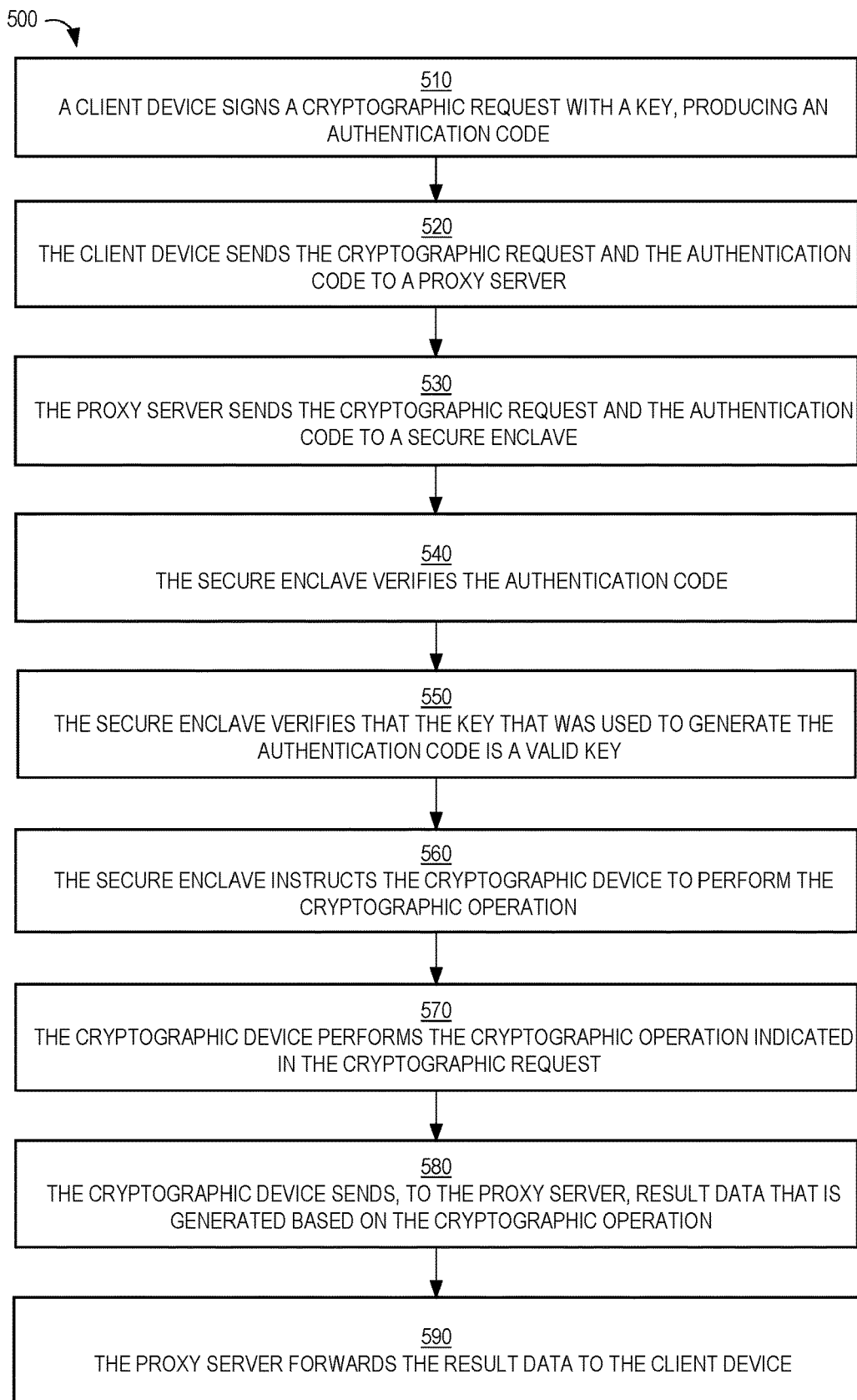
FIG. 5 is an example process for enforcing signature checking in a secure enclave, in an embodiment.

FIG. 5 is an example process 500 for enforcing authentication code checking in a secure enclave, in an embodiment. Process 500 is performed by different elements of system 100 and a secure enclave.

At block 510, a client device signs a cryptographic request (or data associated with the cryptographic request) with its own key, i.e., a key stored on the client device, producing an authentication code, such as a digital signature or a MAC. Examples of data associated a cryptographic request include a key name or identifier of a cryptographic key that the client device is requesting as part of the cryptographic operation (and that is stored in a cryptographic device), an indicator of the type of requested cryptographic operation, the name of a signature algorithm (e.g., SHA-256, SHA-384), a sequence number, a current timestamp, and data (e.g., a hash or challenge) that the client device is requesting the cryptographic device to sign (or the data for the cryptographic device to decrypt), as part of the requested cryptographic operation. Thus, the client device may sign any combination of this data associated with cryptographic request.

At block 520, the client device sends the cryptographic request and the authentication code to a proxy server. Block 520 may involve sending the request and signature over a computer network.

At block 530, the proxy server sends the cryptographic request and the authentication code to a secure enclave. Again, the secure enclave may be on the same computing device as the device that hosts the proxy server. Alternatively, the secure enclave may be on the cryptographic device or in a computing system that is communicatively coupled to the cryptographic device.

At block 540, the secure enclave verifies the authentication code. If the authentication code is not verified, then the secure enclave does not instruct the cryptographic device to perform the cryptographic operation requested in the cryptographic request. If the authentication code is verified, then process 500 proceeds to block 550.

At block 550, the secure enclave verifies that the key that was used to generate the authentication code is a valid key. Block 550 may involve determining whether the key is identified in a white list of valid keys.

At block 560, the secure enclave instructs the cryptographic device to perform the cryptographic operation. If the secure enclave is on the same computing device as the device that hosts the proxy server and the secure enclave does not have network access, then the secure enclave routes the cryptographic request (to the cryptographic device) through the proxy server using end-to-end security where the proxy server acts a black box proxy. Example secure communication protocols to route cryptographic requests through the proxy server using a secure tunnel include TLS (Transport Layer Security), SSH (Secure Shell), or a proprietary protocol. In this way, the proxy server is unable to read or modify the cryptographic request without the cryptographic device detecting such a modification.

At block 570, the cryptographic device performs the cryptographic operation indicated in the cryptographic request. Block 570 involves identifying a particular cryptographic key that is identified based on a key name or identifier included the cryptographic request.

At block 580, the cryptographic device sends result data that is generated based on the cryptographic operation to the proxy server. For example, if the cryptographic request is a signature request, then the result data is a digital signature of a hash or code that was included in the cryptographic request from the client device. If the cryptographic request is a decryption request, then the result data may be a decrypted form of encrypted data that was included in the cryptographic request from the client device.

At block 590, the proxy server forwards the result data to the client device.

Other Signing Parties

The example above involves the client device (or requestor) signing the cryptographic request with its own key and the secure enclave validating the requestor's signature. Additionally or alternatively, embodiments involve other entities signing the cryptographic request (and/or related data). Examples of other entities include proxy server 130 and one or more approvers who authorize the requesting client device submitting the cryptographic request.

For example, a secure enclave may check the digital signature generated by the client device, check the digital signature generated by the proxy server, and check the digital signature generated by an approver (operating another computing device not depicted in FIG. 1). If all checks pass, then the secure enclave authorizes the requested cryptographic operation for the cryptographic device to perform. If at least one of the checks fails (i.e., the digital signature from one of the parties does not match a corresponding digital signature generated by the secure enclave), then the secure enclave does not authorize the cryptographic device to perform the requested cryptographic operation.

In an embodiment, a digital signature generated by client device 110 comes from client device 110. In another embodiment, the digital signature generated by client device 110 comes from an approver that is separate from client device 110. In that case, there may be two or more digital signatures involved, one generated by client device 110 and one or more generated by the approver and one or more other approvers. In yet another embodiment, client device 110 communicates with one or more approvers to approve a cryptographic operation to be requested by client device 110. In response, client device 110 receives one or more digital signatures from the one or more approvers.

Combining Authentication Checking in a Secure Enclave with the Split Secret Model In an embodiment, a technique for verifying a signature authentication code in a secure enclave is combined with a technique that implements the split secret model. For example, client device 110 generates a cryptographic request, uses a key to generate an authentication code based on the cryptographic request, includes secret key information (e.g., a PIN) within the cryptographic request, and sends the cryptographic request and the authentication code to proxy server 130.

As another example, client device 110 generates a cryptographic request, uses a key to generate an authentication code based on the cryptographic request, and sends the cryptographic request and the authentication code to proxy server 130. In response, proxy server 130 sends encrypted secret key information (e.g., an encrypted wrapped key) to client device 110, client device 110 decrypts the encrypted secret key information with its own decryption key, and sends the decrypted secret key information to proxy server 130, after which client device 110 deletes the decrypted secret key information.

In both these examples, proxy server 130 sends the authentication code and the cryptographic request to the secure enclave, which validates the authentication code and forwards the cryptographic request to cryptographic device 140.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
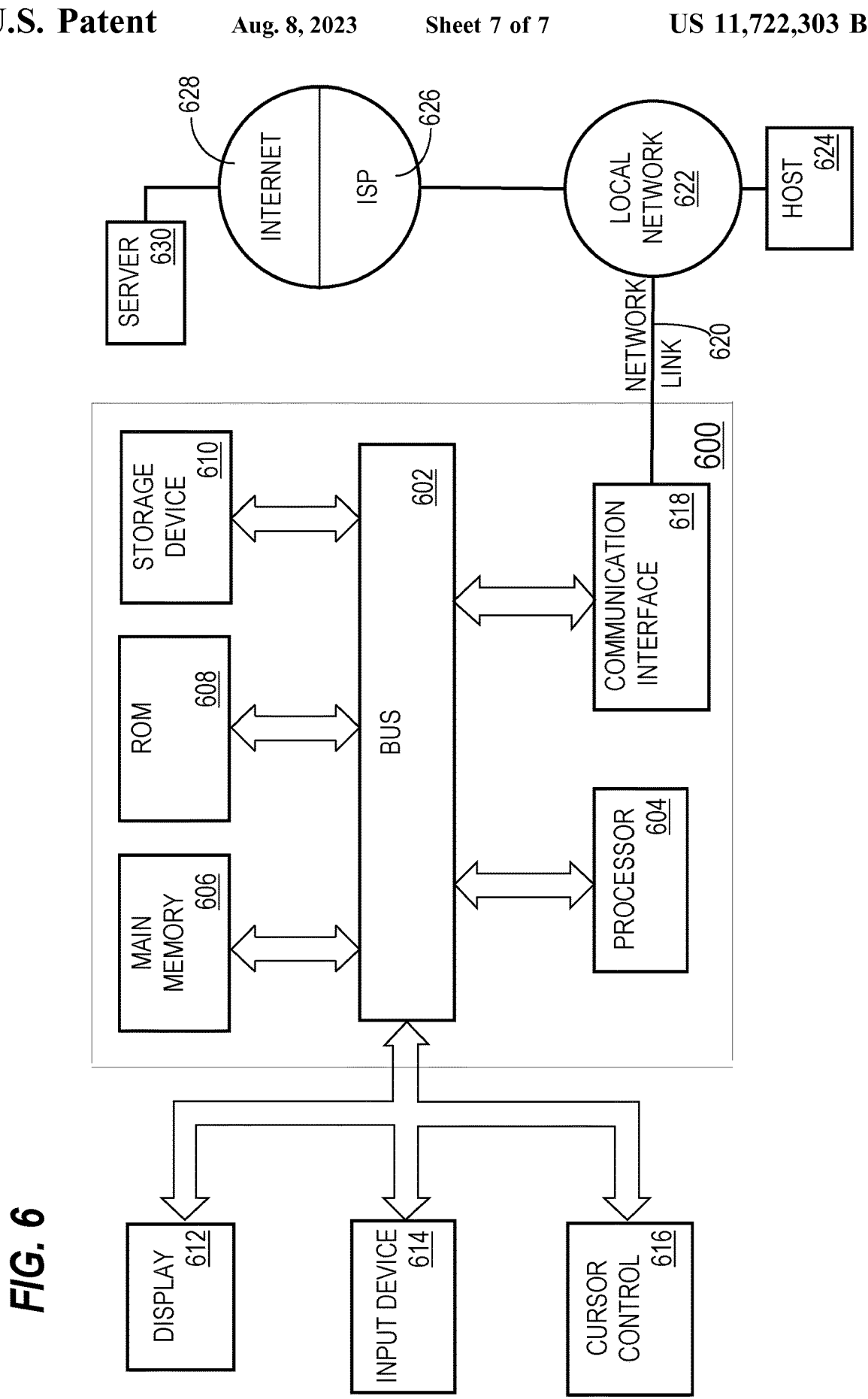
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for enforcing authentication/authorization checking in a secure enclave, the method comprising:
   receiving, by a proxy server, a request for a cryptographic operation that is initiated by a client device, wherein the request includes a key name of a cryptographic key and a code;
   in response to receiving the request, sending, by the proxy server, the code and the request to the secure enclave that is associated with a cryptographic device that stores a plurality of cryptographic keys that includes the cryptographic key;
   wherein the secure enclave validates the code based on a local key that is stored in the secure enclave;
   wherein the secure enclave sends, to the cryptographic device that performs the cryptographic operation, (1) data associated with the secure enclave and (2) the request;
   receiving, by the proxy server, from the cryptographic device, result data that was generated by the cryptographic device as a result of performing the cryptographic operation;
   sending, by the proxy server, to the client device, the result data;
   wherein the method is performed by one or more computing devices.

2. The method of claim 1, wherein the secure enclave is on a computing device that hosts the proxy server or on a first computing device that is in the same computer network as a second computing device that hosts the proxy server.

3. The method of claim 2, further comprising:
after the secure enclave validates the code, receiving, by the cryptographic device, from the secure enclave, the request and the data associated with the secure enclave;
wherein receiving the request and the data associated with the secure enclave is through an end-to-end secure connection that is established between the secure enclave and the cryptographic device.

4. The method of claim 1, wherein the secure enclave and the cryptographic device reside in the same computer network that is separate from a computer network in which the proxy server resides.

5. The method of claim 1, wherein the client device generated the code and the request is from the client device.

6. The method of claim 1, wherein the code is generated by a computing device that is operated by a third-party and that is separate from the client device and the proxy server.

7. The method of claim 1, wherein:
the code is a first code;
sending the code to the secure enclave comprises sending, to the secure enclave, a plurality of codes that includes the first code and a second code;
the secure enclave validates the code based on a second local key that is stored in the secure enclave;
the secure enclave sends the request to the cryptographic device if the secure enclave validates each code in the plurality of codes.

8. The method of claim 7, wherein:
one of the client device, the proxy server, or a third-party entity generated the first code; and
another one of the client device, the proxy server, or the third-party entity generated the second code.

9. The method of claim 1, wherein:
the request also includes secret key information;
sending the code and the request to the secure enclave also includes sending the secret key information to the secure enclave;
the secure enclave also sends the secret key information to the cryptographic device.

10. One or more storage media storing instructions for enforcing authentication/authorization checking in a secure enclave, wherein the instructions, when executed by one or more processors, cause:
receiving, by a proxy server, a request for a cryptographic operation that is initiated by a client device, wherein the request includes a key name of a cryptographic key and a code;
in response to receiving the request, sending, by the proxy server, the code and the request to the secure enclave that is associated with a cryptographic device that stores a plurality of cryptographic keys that includes the cryptographic key;
wherein the secure enclave validates the code based on a local key that is stored in the secure enclave;
wherein the secure enclave sends, to the cryptographic device that performs the cryptographic operation, (1) data associated with the secure enclave and (2) the request;
receiving, by the proxy server, from the cryptographic device, result data that was generated by the cryptographic device as a result of performing the cryptographic operation;
sending, by the proxy server, to the client device, the result data.

11. The one or more storage media of claim 10, wherein the secure enclave is on a computing device that hosts the proxy server or on a first computing device that is in the same computer network as a second computing device that hosts the proxy server.

12. The one or more storage media of claim 11, wherein the instructions, when executed by the one or more processors, further cause:
after the secure enclave validates the code, receiving, by the cryptographic device, from the secure enclave, the request and the data associated with the secure enclave;
wherein receiving the request and the data associated with the secure enclave is through an end-to-end secure connection that is established between the secure enclave and the cryptographic device.

13. The one or more storage media of claim 10, wherein the secure enclave and the cryptographic device reside in the same computer network that is separate from a computer network in which the proxy server resides.

14. The one or more storage media of claim 10, wherein the client device generated the code and the request is from the client device.

15. The one or more storage media of claim 10, wherein the code is generated by a computing device that is operated by a third-party and that is separate from the client device and the proxy server.

16. The one or more storage media of claim 10, wherein:
the code is a first code;
sending the code to the secure enclave comprises sending, to the secure enclave, a plurality of codes that includes the first code and a second code;
the secure enclave validates the code based on a second local key that is stored in the secure enclave;
the secure enclave sends the request to the cryptographic device if the secure enclave validates each code in the plurality of codes.

17. The one or more storage media of claim 16, wherein:
one of the client device, the proxy server, or a third-party entity generated the first code; and
another one of the client device, the proxy server, or the third-party entity generated the second code.

18. The one or more storage media of claim 10, wherein:
the request also includes secret key information;
sending the code and the request to the secure enclave also includes sending the secret key information to the secure enclave;
the secure enclave also sends the secret key information to the cryptographic device.

19. A system for enforcing authentication/authorization checking in a secure enclave, the system comprising:
one or more processors;
one or more storage media storing instructions which, when executed by the one or more processors, cause:
receiving, by a proxy server, a request for a cryptographic operation that is initiated by a client device, wherein the request includes a key name of a cryptographic key and a code;
in response to receiving the request, sending, by the proxy server, the code and the request to the secure enclave that is associated with a cryptographic device that stores a plurality of cryptographic keys that includes the cryptographic key;
wherein the secure enclave validates the code based on a local key that is stored in the secure enclave;
wherein the secure enclave sends, to the cryptographic device that performs the cryptographic operation, (1) data associated with the secure enclave and (2) the request;

receiving, by the proxy server, from the cryptographic device, result data that was generated by the cryptographic device as a result of performing the cryptographic operation;

sending, by the proxy server, to the client device, the result data.

20. The system of claim 19, wherein the secure enclave is on a computing device that hosts the proxy server or on a first computing device that is in the same computer network as a second computing device that hosts the proxy server.

* * * * *